United States Patent
Unbehagen et al.

(10) Patent No.: US 9,432,213 B2
(45) Date of Patent: Aug. 30, 2016

(54) IP FORWARDING ACROSS A LINK STATE PROTOCOL CONTROLLED ETHERNET NETWORK

(75) Inventors: Paul Unbehagen, Apex, NC (US); David Allan, Ottawa (CA); Nigel Bragg, Weston Colville (GB)

(73) Assignee: RPX Clearinghouse LLC, San Francisco, CA (US)

( * ) Notice: Subject to any disclaimer, the term of this patent is extended or adjusted under 35 U.S.C. 154(b) by 2610 days.

(21) Appl. No.: 12/151,684

(22) Filed: May 8, 2008

(65) Prior Publication Data

US 2009/0279536 A1    Nov. 12, 2009

Related U.S. Application Data

(60) Provisional application No. 61/196,738, filed on Dec. 31, 2007.

(51) Int. Cl.
*H04L 12/46* (2006.01)
*H04L 12/751* (2013.01)
*H04L 12/721* (2013.01)

(52) U.S. Cl.
CPC ........... *H04L 12/4625* (2013.01); *H04L 45/02* (2013.01); *H04L 45/66* (2013.01)

(58) Field of Classification Search
CPC .... H04L 12/4625; H04L 45/02; H04L 45/66
USPC ................................. 370/352, 400
See application file for complete search history.

(56) References Cited

U.S. PATENT DOCUMENTS

| | | | |
|---|---|---|---|
| 7,436,860 B2 | 10/2008 | Lee et al. | |
| 2003/0026271 A1* | 2/2003 | Erb et al. | 370/401 |

(Continued)

FOREIGN PATENT DOCUMENTS

| | | |
|---|---|---|
| JP | 2000049870 A1 | 2/2000 |
| KR | 10-2004-0062343 A1 | 7/2004 |
| KR | 10-2004-0066826 A1 | 7/2004 |
| KR | 10-2004-0066902 | 7/2004 |
| KR | 10-2004-0074135 | 8/2004 |

(Continued)

OTHER PUBLICATIONS

European Search Report dated Jul. 29, 2011 for European Regional Phase Application No. 08870330.1-2416 based from International Application No. PCT/US2008/088532; International Filing date Dec. 30, 2008 consisting of 10 pages.

(Continued)

*Primary Examiner* — Khaled Kassim
(74) *Attorney, Agent, or Firm* — Christopher & Weisberg, P.A.

(57) ABSTRACT

Nodes on an Ethernet network run a link state protocol on the control plane and install shortest path forwarding state into their FIBs to allow packets to follow shortest paths through the network without requiring MAC header replacement at each hop through the network. When a node learns an IP address, it will insert the IP address into its link state advertisement to advertise reachability of the IP address to the other nodes on the network. Each node will add this IP address to its link state database. If a packet arrives at an ingress node, the ingress node will read the IP address, determine which node on the link state protocol controlled Ethernet network is aware of the IP address, and construct a MAC header to forward the packet to the correct node. The DA/VID of the MAC header is the nodal MAC of the node that advertised the IP address. Unicast and multicast IP forwarding may be implemented.

14 Claims, 5 Drawing Sheets

(56) References Cited

U.S. PATENT DOCUMENTS

| | | | |
|---|---|---|---|
| 2004/0037279 A1 | 2/2004 | Zelig et al. | |
| 2004/0213228 A1 | 10/2004 | Tingle et al. | |
| 2005/0055435 A1 | 3/2005 | Gbadegesin et al. | |
| 2005/0083949 A1 | 4/2005 | Dobbins et al. | |
| 2005/0259597 A1 | 11/2005 | Di Benedetto et al. | |
| 2006/0126496 A1* | 6/2006 | Filsfils et al. | 370/216 |
| 2006/0262735 A1 | 11/2006 | Guichard et al. | |
| 2007/0288653 A1 | 12/2007 | Sargor et al. | |
| 2009/0037607 A1* | 2/2009 | Farinacci et al. | 709/249 |

FOREIGN PATENT DOCUMENTS

| | | |
|---|---|---|
| KR | 10-2004-0107702 A1 | 12/2004 |
| KR | 10-2005-0002608 | 1/2005 |
| WO | 9718637 A2 | 5/1997 |
| WO | 03045012 A1 | 5/2003 |
| WO | 03055151 A1 | 7/2003 |
| WO | 03065682 A1 | 8/2003 |
| WO | 2006070197 A2 | 7/2006 |
| WO | 2007041860 A1 | 4/2007 |

OTHER PUBLICATIONS

International Search Report from corresponding PCT application PCT/US2008/088532.
European Search Report dated May 21, 2012 for European Regional Phase Patent No. 12159975.7-2416; European Filing date Mar. 16, 2012 consisting of 8 pages.
English_Translation_of_Japanese_Office_Action dated Dec. 11, 2012 for Japanese Serial No. 2010-540940, dated Jun. 29, 2010 consisting of 4-pages.
2nd European Examination Report dated Apr. 11, 2013 for European Regional Phase Application Serial No. 08870330.1, Regional Phase Entry Date.: Jun. 29, 2010 consisting of 7-pages.
IEEE_P802_1ahD4_0_Virtual_Bridged_Local_Area_Network_Amendment_6_Provider_Backbone_Bridge dated Nov. 21, 2007 consisting of 6-pages.
IEEE_P802_1ahD4_0_Draft_Standard_for_Local_and_Metropolitan_Area_Network_Virtual_Bridged_Local_Area_Networks_Amendment_6_Provider_Backbone_Bridges dated Nov. 21, 2007 consisting of 102-pages.
1st Japanese Office Action dated Nov. 26, 2013 and English Translation of Japanese Office Action for Japanese National Stage Application Serial No. 2013-048223, National Stage Filing Date.: Mar. 10, 2012 consisting of 3-pages.
European First Examination Report dated Nov. 24, 2014 for European Divisional Application Serial No. 2466807, European Filing Date: Mar. 16, 2012 consisting of 7 pages.
Rob Coltun and Juha Heinanen, Opaque Fore Systems: "The OSPF Opaque LSA Option; draft-ietf-ospf-opaque-06.txt", Jun. 1, 1998, vol. ospf, No. 6, Jun. 1, 1998 , XP015024732, ISSN: 0000-0004 Internal Draft Expiration Date: May 1998 File Name: draft-ietf-ospf-ara-02.txt consisting of 40-pages.
Korean language 1st Office_Action and its English Translation dated Dec. 2, 2014 for Korean Divisional Serial No. 10-2014-7023964, filed Aug. 27, 2014 consisting of 8-pages.
Third Examination Report dated Feb. 10, 2015 for European Regional Patent Application No. 08870330.1, EP Entry Date: Jun. 29, 2010, consisting of 6 pages.
2nd Chinese Examination Report dated Oct. 28, 2013 for Chinese National Stage Application Serial No. 200880127493.8, National Stage Entry Date.: Aug. 25, 2010 consisting of 8-pages.
Korean language 2nd Office_Action and its English Translation dated Dec. 16, 2014 for Korean Divisional Serial No. 10-2010-7017231, filed Jul. 30, 2010 consisting of 7-pages.

* cited by examiner

IP FORWARDING ACROSS A LINK STATE PROTOCOL CONTROLLED ETHERNET NETWORK

CROSS-REFERENCE TO RELATED APPLICATIONS

This application claims priority to the U.S. Provisional Patent Application that results from the conversion of U.S. Utility patent application Ser. No. 12/006,258, filed Dec. 31, 2007, which was entitled IP FORWARDING ACROSS A LINK STATE PROTOCOL CONTROLLED ETHERNET NETWORK, the content of which is hereby incorporated herein by reference. Applicants filed a petition to convert this Utility patent application to a provisional application on Mar. 28, 2008, and are thus claiming priority to the provisional application that results therefrom.

TECHNICAL FIELD

The present invention relates to link state protocol controlled Ethernet networks, and, more particularly, IP forwarding across a link state protocol controlled Ethernet network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements.

Ethernet is a well known networking protocol that has been defined by the Institute of Electrical and Electronics Engineers (IEEE) as standard 802.1 In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast or flooded on the network. A characteristic of a spanning tree is that there is only one path between any pair of destinations in the network, and therefore it was possible to "learn" the connectivity associated with a given spanning tree by watching where packets came from. However the spanning tree itself was restrictive and often led to over-utilization of the links that were on the spanning tree and non-utilization of the links that weren't part of the spanning tree.

To overcome some of the limitations inherent in Ethernet networks implementing a spanning tree, a link state protocol controlled Ethernet network was disclosed in application Ser. No. 11/537,775, filed Oct. 2, 2006, entitled "Provider Link State Bridging," the content of which is hereby incorporated herein by reference. As described in greater detail in that application, rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network, and can individually populate their forwarding information bases (FIBs) according to the computed view of the network.

When all nodes have computed their role in the synchronized view and populated their FIBs, the network will have a loop-free unicast tree to any given bridge from the set of peer bridges (those that require communication to that bridge for whatever reason); and a both congruent and loop-free point-to-multipoint (p2mp) multicast tree from any given bridge to the same set or subset of peer bridges per service instance hosted at the bridge. The result is the path between a given bridge pair is not constrained to transmitting the root bridge of a spanning tree and the overall result can better utilize the breadth of connectivity of a mesh. In essence every bridge roots one or more trees which define unicast connectivity to that bridge, and multicast connectivity from that bridge.

When customer traffic enters a provider network, the customer MAC address (C-MAC DA) is resolved to a provider MAC address (B-MAC DA), so that the provider may forward traffic on the provider network using the provider MAC address space. Additionally, the network elements on the provider network are configured to forward traffic based on Virtual LAN ID (VID) so that different frames addressed to the same destination address but having different VIDs may be forwarded over different paths through the network. In operation, a link state protocol controlled Ethernet network may associate one VID range with shortest path forwarding, such that unicast and multicast traffic may be forwarded using a VID from that range, and traffic engineering paths may be created across the network on paths other than the shortest path, and forwarded using a second VID range.

FIG. 1 is a functional block diagram of an example of a portion of a link state protocol controlled Ethernet network 10. As shown in FIG. 1, the network 10 in this example includes a plurality of network elements 12, interconnected by links 14. The network elements 12 exchange hello messages to learn adjacencies of other network elements, and exchange link state advertisements to enable each node to build a link state database that may be used to calculate shortest paths between ingress and egress nodes through the network.

Examples of link state routing protocols include Open Shortest Path First (OSPF) and Intermediate System to Intermediate System (IS-IS), although other link state routing protocols may be used as well. IS-IS is described, for example, in ISO 10589, and IETF RFC 1195, the content of each of which is hereby incorporated herein by reference.

In addition to installing shortest path unicast forwarding state, the nodes may also install forwarding state for multicast trees on the network. An example of a way to implement multicast in a link state protocol controlled Ethernet network is described in greater detail in U.S. patent application Ser. No. 11/702,263, filed Feb. 5, 2007, entitled "Multicast Implementation in a Link State Protocol Controlled Ethernet Network" the content of which is hereby incorporated herein by reference. As described in that application, link state advertisements may be used to advertise multicast group membership to cause forwarding state for a multicast group to be installed on the network. In particular, each source in a given multicast group may be assigned a destination MAC Address (DA) that is used to forward the frames on the network. The nodes on the network install forwarding state for the source/group tree if they determine that they are on a shortest path from the multicast source to one of the destination nodes advertising via the link state protocol an "interest" in the multicast group.

Interest in a multicast may be based on the community of interest identifier such as the I-SID, such that a node on the network will install forwarding state for a multicast group when it is on a shortest path between a source and destination that have both advertised interest in the community of interest identifier associated with the multicast group. An I-SID normally is associated with 802.1ah and implies an additional MAC header (customer source & destination MAC addresses). However, the I-SID has utility even if a C-MAC header is not used, because an I-SID value can identify the participants in a specific instance of mutual connectivity The forwarding state, however, is based on the multicast DA and VID associated with the multicast.

In operation, multiple nodes on the network may advertise interest in a particular I-SID. The nodes on the network keep track of which nodes have advertised interest in which I-SID and will install forwarding state for a DA/VID pair associated with the I-SID if they are on the shortest path between two nodes that have advertised interest in the particular I-SID. This allows forwarding state to be installed for communities of interest without requiring flooding of the frames on the network.

Link state protocol controlled Ethernet networks operate at the link layer (Layer 2). That is, the ingress node creates a MAC header that may be used to switch the frame across the Ethernet network, e.g. from Node A to Node E. Other networks, such as Internet Protocol (IP) networks, operate at a higher layer such as Layer 3 (network layer). IP networks forward packets based on an IP address of an IP header associated with an IP packet.

FIGS. 2 and 3 show two common ways in which IP routing may be used to forward an IP packet on a conventional IP network. In the example shown in FIG. 2, network 20 interconnects network X and network Y. The network 20 includes many routers 22 and may have a configuration similar to the network shown in FIG. 1. In FIGS. 2 and 3 it has been assumed that the path through network 20 will be via nodes A, B, C, D, E. To simplify explanation of the operation of the network 20, routers that are not on the selected path between networks X and Y have not been shown in FIGS. 2 and 3.

Generally when a packet arrives at router 22A, the router will perform an IP lookup based on the IP address in the packet and determine a next hop for the packet on the IP network. The router will then resolve the next hop IP address to a layer 2 MAC address and create a Layer 2 MAC header for the packet and transmit the packet on a link 24A to the next hop router along the path to the destination. In this example, router 22A will add a MAC header with a Destination MAC Address (DA)=I, and a Source MAC Address (SA)=H. The router 22A will then forward the packet onto the link to router 22B.

When router 22B receives the packet it will strip off the MAC header and perform a lookup on the IP header. It will then encapsulate the packet with a new MAC header which in this example has DA=K, and SA=J. It will then forward the packet toward its destination on link 24B. This strip and add process will be performed at each router along the path until the packet arrives at the destination network Y. Thus, for conventional IP forwarding, each router along the path will strip off the outer 802.3 header, perform an IP lookup to route the packet, and then add a new 802.3 header to forward the packet across the network. This process is repeated hop by hop with each router stripping off the MAC header and performing an IP lookup to route the packet through the network.

FIG. 3 shows another manner in which IP routing may be implemented. In the example shown in FIG. 3, MPLS is used to reduce the number of IP lookups performed at the various routers in the network. In an MPLS network, a plurality of Label Switched Paths (LSPs) will be established through the MPLS network. The particular manner in which LSPs are determined and created through the network is well known. In the example shown in FIG. 3 it will be assumed that the label switched path includes nodes A, B, C, D, E. When a packet arrives at the edge router 32A, the edge router 32A will perform an IP lookup to determine which label should be used to switch the IP packet onto the LSP through the MPLS network to reach network Y. The edge router 32A will then apply that label to the packet. The edge router 32A will also determine a next hop for the packet on the path and apply a MAC header to the packet to cause the packet to be forwarded to the next hop on the path (router 32B).

Router 22B will strip the outer MAC header and read the MPLS label. When the LSP was established through the network the label distribution protocol will have established an association between label 100 and label 210 for a particular IP Forwarding Equivalence Class such that when the router 32B receives a packet with MPLS label 100 it will replace the label with a new MPLS label 210 before adding a new MAC header and forwarding to the outbound interface. Similar to the operation in FIG. 2 before forwarding the packet, router 32B will add a new MAC header to the packet which, in this instance, is SA=J, DA=K to identify the source MAC address as MAC J on router 32B and the destination MAC address as MAC K on router 32C.

MPLS thus allows a single IP route lookup to be performed at the edge of the MPLS network, and allows label switching to be used instead of IP lookups to forward the packet across the MPLS network. Edge routers that perform the initial IP lookup and assign the label to the packet to place the packet on the LSP are referred to as Label Edge Routers. Intermediate routers on the MPLS network that perform label switching are commonly referred to as Label Switch Routers (LSRs). Forwarding in an MPLS network is performed by swapping a label after stripping the MAC header at each hop. MPLS forwarding still requires MAC header stripping to occur at every hop across the network (when Ethernet links are employed), requires each LSR to perform a label lookup and label swap, and requires each LSR to then add another MAC header to deliver the packet to the next LSR along the LSP. This process requires more processing and intelligence on each of the nodes which thus results in an expensive solution. Additionally, for this to work the path must be initially set up which in and of itself is a computationally expensive process.

IP networks and network layer protocols in general are supported by lower layer network, such as an Ethernet network. Hence, when a router transmits a network layer packet it will apply a lower layer protocol header such as an Ethernet MAC header to the packet before transmitting the packet on the network. The MAC header is used at the link layer to forward the packet over the Layer 2 network that is providing support for the network layer. Accordingly, it would be advantageous to enable link state protocol controlled Ethernet networks to integrate support for network layers as well.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
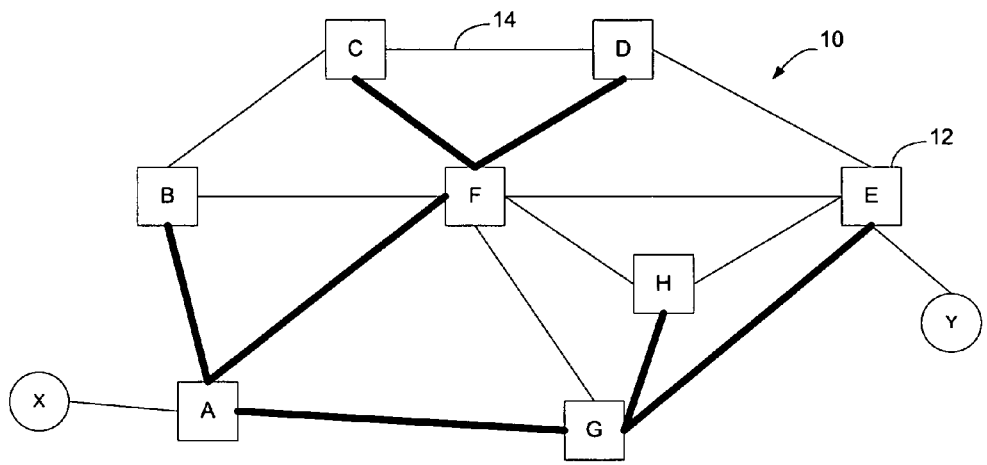
FIG. 1 is a functional block diagram of a mesh network that may be used to implement a link state protocol controlled Ethernet network.
Figure 2:
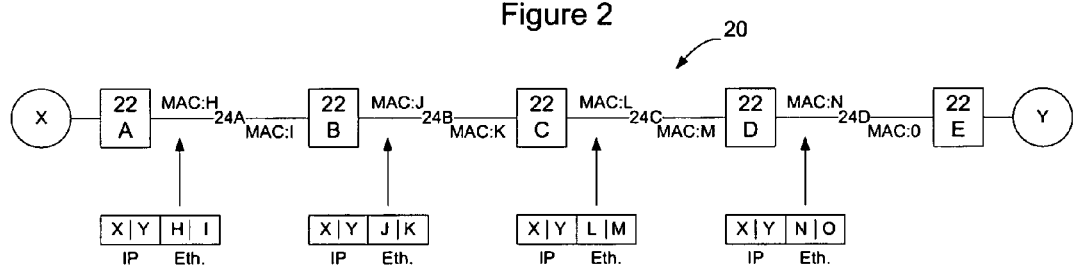
FIGS. 2 and 3 are functional block diagrams showing two ways of implementing IP routing in an IP network.
Figure 3:
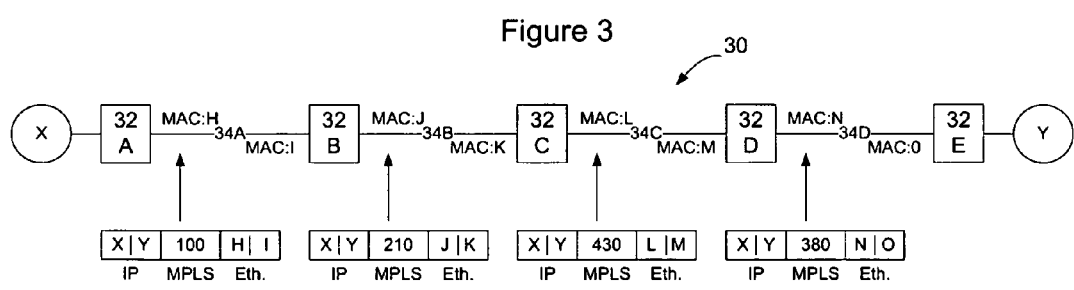

Nodes on a link state protocol controlled Ethernet network implement a link state routing protocol such as Intermediate System to Intermediate System (IS-IS). The nodes on the network learn adjacencies from the IS-IS Link State Advertisements (LSAs), also known as Link State Packets, and compute shortest paths between all pairs of nodes on the network. Each participating node populates its Forwarding Information Base (FIB) to construct unicast forwarding state between each pair of nodes on the network. Traffic engineered paths may also be constructed and forwarding state for the TE paths is installed into the nodes' FIBs on the network.

IS-IS permits topology information and the bindings of layer 2 and layer 3 addresses to specific network locations and interfaces to be exchanged independent of the switching or forwarding technology used in specific network elements. This facilitates two things, the first is that the topology considered by the IS-IS computation is similarly independent of the actual switching or forwarding employed, and secondly that that the construction of a network within a common IS-IS domain may be a concatenation of switching technologies such as Ethernet and MPLS, IPv4 or IPv6. The routing system may determine shortest paths across the network that transit multiple forwarding paradigms. The result is a system with routing domains (the set of network nodes participating in an instance of a routing protocol) that may encompass one or more Ethernet switching domains. One degenerate case is the complete congruence of a routing domain and a switching domain, another is the current status quo where all nodes in the routing domain perform forwarding at layer 3 and Ethernet is only employed as a link technology.

A link state protocol controlled Ethernet network virtualizes LAN connectivity and associates virtual LAN instances with 802.1ah I-SIDs. Most network layer routing systems and protocol suites already acknowledge the LAN segment as a topology element, therefore it is advantageous to maintain the metaphor when integrating virtual LAN segments with the network layer as most required behaviors are well understood. The LAN segment frequently appears at the network layer as a sub-network or subnet such that the set of network layer addresses associated with the nodes connected by the LAN segment can be aggregated into a single advertisement known in the IP world as a prefix.

A switching domain may implement one or more virtual LAN segments. Therefore, to construct a network at the network layer, a mechanism is required to interconnect virtual LAN segments. Nodes attached to the switching domain may be configured to implement network layer forwarding and use network layer information in received packets to forward packets between virtual LAN segments. The forwarding elements will subsequently be termed "Virtual Forwarding Elements" or VFEs.

Switching domains may be interconnected by devices that perform exclusively network layer forwarding. The common instantiation is a router. It is necessary to augment IS-IS to convey additional knowledge of the extent of a switching domain so that the correct egress from a switching domain can be resolved when the switching domain and routing domain are not congruent. This is in the form of knowledge as to whether a node offers L2 transit and whether links are Ethernet or not. These are direct extensions of concepts that exist in the network layer routing world (e.g. Network Layer Port ID (PIED) to designate services supported or the overload bit indicating whether a node offers transit).

Similar to the way in the IP world that the use of unnumbered links reduces address consumption, it is advantageous to consider the concept of a virtual LAN segment that exists explicitly to interconnect a plurality of VFEs and therefore requires no end system addressing. A LAN segment of this nature will be referred to herein as a "transit I-SID", and the addressed version of the virtual LAN segment will be referred to herein as a UNI I-SID. It is possible even to consider a network constructed using the concatenation of multiple transit I-SIDs, however the additional complexity offers no additional utility, so the remainder of this disclosure will only consider the single transit I-SID as interconnect between a set of VFEs.

An additional virtue of the transit I-SID is that the overall amount of state for L2/L3 integration can be divided between the set of VFEs in the network. The amount of state associated with a VFE being the sum of the L2 and L3 state associated with the set of UNI I-SIDs that are directly connected via the VFE. This is typically in the form of both end system network layer addressing and network layer to Ethernet MAC bindings. Dividing the state between VFEs by the use of transit I-SIDs permits a VFE to only have knowledge of network layer information for UNI I-SIDs and ports which have an association with a common transit I-SID.

Similarly access to the L2/L3 hybrid network is not required to be via a virtual LAN segment. A physical LAN segment or physical point to point connection is also a valid attachment to the hybrid network. A physical LAN segment will similarly be identified as a UNI with a NULL I-SID, while the point to point connection case will be referred to as a UNI port.

When a node in the routing domain determines that a network layer address or prefix, outside the routing domain may be reached via itself, it will include the network layer information into its link state advertisements. This may be a result of being configured with this knowledge or by a discovery mechanism. The network layer information will be associated with one of a UNI I-SID, a UNI port (for directly connecting end systems to a switched domain) or with a network layer forwarder such as a router (used herein to describe the entity used for attaching end systems not directly connected to a switched domain).

Each node in the switching domains encompassed by the routing domain will add this network layer prefix to its link state database. Nodes that implement VFEs within the switching domain will use this information to correctly populate their FIBs so that, when an packet arrives at a VFE, the VFE may read the network layer address and determine the appropriate forwarding action to continue to forward the packet on the shortest path to the network layer destination in the routing domain.

In a multicast context, the nodes in a switched domain may be configured to install forwarding state for a network layer multicast group if they are on a shortest path between two nodes that have advertised an interest in the same network layer multicast group address. A network layer multicast information element, such as a Type Length Value tuple (TLV), may be added to IS-IS to enable nodes on the link state protocol controlled Ethernet network to advertise interest in an IP multicast in a link state advertisement. Similarly an algorithmic or administered translation of network layer multicast to an I-SID value may be employed such that existing link state bridging add/move/change procedures will also handle multicast routing across a given switched domain. When a node issues a link state advertisement containing an IP multicast address, the nodes will update their link state database to indicate the multicast group membership. The nodes will also determine if they are an intermediate node on a path between an IP multicast source and a node advertising an interest in the IP multicast (destination or Group node). If so, the intermediate node will install forwarding state for a multicast DA associated with the IP multicast group so that the link state protocol controlled Ethernet network may provide transport services for the IP multicast.

When an IP multicast packet is received at an ingress to the link state protocol controlled Ethernet network, the ingress node performs an IP lookup to determine the multicast DA to be used on the link state protocol controlled Ethernet network, and constructs a MAC header for the frames that will be used to carry the IP packet. The frames are then output with the multicast header to be forwarded by the intermediate nodes (using the FIB state installed for that multicast DA) to the nodes that have advertised interest in the IP multicast.

By tying network layer routing to link state protocol controlled Ethernet network forwarding, the IP services may be carried end-to-end across the link state protocol controlled Ethernet network without requiring additional signaling to set up the paths for the unicast or multicast switched paths required for the IP routes. This allows link state protocol controlled Ethernet network shortcuts to be created for network layer routes so that L3 forwarding may be mapped to L2 switching across the link state protocol controlled Ethernet network domain.

It is possible to support multiple network layer protocols simultaneously in a switched domain and on common interfaces outside the switched domain. Information about multiple network layer protocols (e.g. IPv4 and IPv6) may be carried via the link state routing protocol and VFEs may incorporate multiple network layers into the FIBs such that any packet received on a network layer supported by the routing domain may be correctly resolved.

Figure 4:
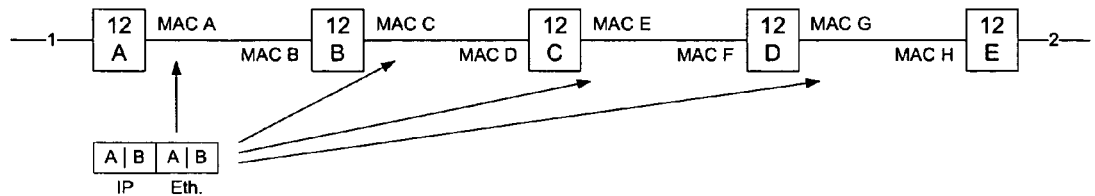
FIG. 4 is a functional block diagram showing the flow of an IP packet across a link state protocol controlled Ethernet network according to an embodiment of the invention.

A link state protocol controlled Ethernet network can be used to implement network layer routing and forwarding by causing the ingress nodes to a switched domain in the network to map network layer addresses to paths through the link state protocol controlled Ethernet network. FIG. 4 shows one example of how IP forwarding may be implemented where the link state protocol controlled Ethernet network nodes are configured to map IP addresses to endpoint Ethernet MAC addresses in the link state protocol controlled Ethernet network. Additional information associated with advertising network layer addresses using IS-IS is disclosed below.

Advertising the network layer addresses allows the ingress node 12A to determine, when a network layer packet is received, which other link state protocol controlled Ethernet network node on the network is able to reach the network layer address. The link state protocol controlled Ethernet network node then creates a MAC header that is used to forward the network layer packet on the network. In this instance, the MAC address is the nodal MAC of the exit node (router E in the example shown in FIG. 4). Since the intermediate nodes have installed shortest path forwarding state to allow them to forward packets addressed to nodal MAC E along the shortest path to that node, the intermediate nodes B, C, and D simply perform a MAC lookup in their Forwarding Information Bases (FIBs) and forward the packet to the correct destination on the network. The intermediate nodes are not required to strip the MAC header off and create a new MAC header at each hop along the path. Thus, link state protocol controlled Ethernet network paths may be used to implement network layer forwarding through a link state protocol controlled Ethernet network.

When a node in the routing domain learns of a network layer address or prefix, it will advertise the address in an IS-IS link state advertisement. Nodes in the switched domain will store the address as an attribute in a link state database containing other routing information commonly transmitted using link state advertisements, such as node adjacencies, I-SIDs, and other information that may be transmitted using a LSA. Since all nodes know where the network address or prefix attaches to the network, the nodes may select the correct egress MAC address to reach a particular node. Additionally, the nodes are able to install forwarding state to set up connectivity on the network between nodes advertising interest in the same network addresses.

A network layer prefix may be associated with a virtual or physical LAN segment. These are identified as I-SIDs in the routing system, so an explicit association of prefix to I-SID exists in the routing database. Within a switched domain there is no restriction on which physical or virtual ingress ports are associated with an I-SID, so network design will focus on simply which I-SIDs a VFE interconnects. B-MAC switching may be used to transport unicast IP traffic through the switched domain using a single IP lookup and L3/L2 resolution step at the edge of the switched domain, and creation of a MAC header that will transport the network packet through the network to the egress node from the switched domain. This allows lookup and resolution to occur once, while allowing more efficient and network layer independent switching to occur in connection with forwarding of the packet without requiring the MAC header to be replaced at each hop through the switched domain.

According to an embodiment of the invention, the routing protocol that is used to exchange network topography in the link state protocol controlled Ethernet network, such as IS-IS, is used to transport network layer addresses between network nodes. This allows all nodes to learn which network layer addressed end systems are accessible via each of the other nodes on the routed domain. The network layer addresses may be shared by the nodes' link state database, and used to identify the multicast topology and also to determine associations between L2 and L3 network topology.

When a packet arrives at a VFE, either from outside the local switched domain, or from within the domain carrying a B-MAC identifying the VFE, the VFE will perform a network layer route lookup to determine the appropriate forwarding action for the packet. This may be one of:

1) Forwarding a packet to a directly connected network layer forwarder, when the shortest path is to immediately egress the local switched domain.
2) Forward the packet to a UNI I-SID. This will require handing the packet off from a VFE to a virtual bridge which will determine the correct C-MAC for the network layer and resolve it to the appropriate B-MAC to reach the egress from the switched domain.
3) Forward the packet to a peer VFE in the switched domain. This involves resolving the MAC of the peer VFE node and forwarding the packet appropriately.
4) Forward the packet to a UNI port.

Normal network layer processing of the packet is performed as part of the VFE forwarding process, for example by decrementing the IPv4 or IPv6 time to live (TTL) counters.

For packets that are forwarded within the switched domain, the VFE will then construct a MAC header for the packet as shown in FIG. 4 to forward the packet to the egress node over the switched domain. Specifically, the edge node will determine the MAC header that may be used for switching the packet across the link state protocol controlled Ethernet network to the destination node on the network. The packet may then be output onto the switched domain to cause the packet to be forwarded to the destination node. Because the link state protocol controlled Ethernet network is designed to forward frames of data according to the MAC Destination Address and VLAN ID (DA/VID), using information previously populated into forwarding information bases, the nodes on the network will forward the network layer packet across the link state protocol controlled Ethernet network to edge node E without requiring the outer MAC header to be changed at each intermediate node.

Thus Ethernet switching may be used to implement network layer forwarding via which a single network layer lookup may be performed on an packet as it arrives at a VFE in a switched domain. The network address may be mapped to a MAC header that can be used to transport the packet across the switched domain without requiring further network layer lookup operations as the packet traverses the switched domain. Thus, it is able to achieve the benefits of MPLS which also does not require a network layer lookup but implements Ethernet switched domains at the granularity of link rather than subnetwork. However, using link state protocol controlled Ethernet network to forward network layer traffic has the further advantage over MPLS that it does not require the MAC header to be stripped off at intermediate nodes nor the addition of a label added to simulate switching behavior. Rather, the same MAC header may be used to switch the packet through multiple network nodes as the packet traverses the nodes on the network.

Figure 5:
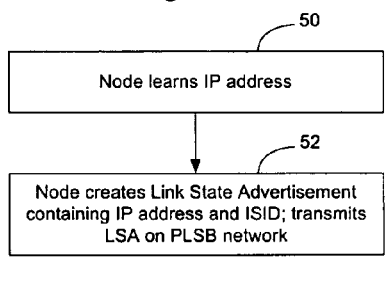
FIG. 5 is a flow diagram of a process performed at an ingress node of a link state protocol controlled Ethernet network to process IP information according to an embodiment of the invention.

FIGS. 5-8 show parts of the process implemented by nodes on the switched domain of FIG. 4 to enable the network to forward network layer frames according to an embodiment of the invention. As shown in FIG. 5, when an edge node learns a network layer address (50), it will add it to its link state advertisement network layer address. The LSA may have a type-length-value (TLV) designating it as containing network layer addresses such as IPv4 or IPv6 addresses. The LSA will then be transmitted on the network (52) to enable the edge node to advertise knowledge of the network layer address. Note in this regard that IS-IS LSAs are configured to carry network layer addresses. This native capacity may be used in connection with an embodiment of the invention, and the network layer addresses may then be used in a novel way to enable network layer forwarding to take place using the pre-installed shortest path forwarding state of the FIBs of the nodes on the switched domain.

In a multicast context, the edge node may form a binding between the multicast network layer address and an I-SID that will be associated with the network layer multicast or use native means to derive the Ethernet group address to use for forwarding. Membership in a network layer multicast may be advertised by an interested node using, for example, Internet Group Management Protocol (IGMP) or another group management protocol. When a node receives an IGMP message from an attached router, one useful technique is to resolve the IGMP message to an I-SID associated with the IP multicast and generate a link state advertisement containing the network layer multicast address, which will then be transmitted on the link state protocol controlled Ethernet network. The node is then added to the multicast group and the connectivity constructed as a normal part of operations.

Figure 6:
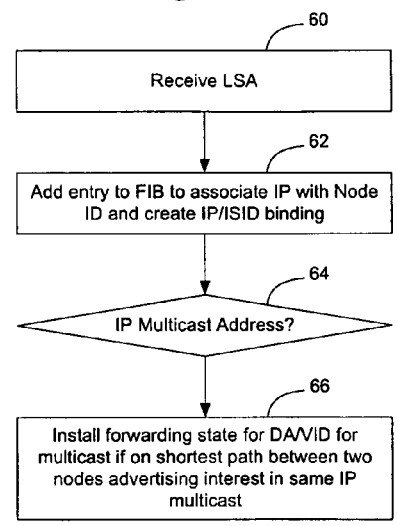
FIG. 6 is a flow diagram of a process performed at an intermediate node or edge node of a link state protocol controlled Ethernet network to process IP information according to an embodiment of the invention.

As shown in FIG. 6, when a node in the routed domain receives an LSA (60) it will update its link state database to associate the network layer address with the ID of the node that issued the LSA. Nodes within the switched domain will also update their link state databases with the Nodal MAC address associated with the network layer address (62). If the network layer address is a network layer multicast address (64), the node will also determine if it is on a shortest path between two nodes that have advertised interest in the same network layer multicast (66). If so, the node will install forwarding state into its FIB for the DA/VID associated with the network layer multicast address. Network layer multicast membership is commonly implemented using a protocol such as IGMP. As edge nodes receive IGMP messages from attached networks, the nodes on the link state protocol controlled Ethernet network may create LSAs as described above in connection with FIG. 5 to advertise the changes to the network layer multicast membership on the link state protocol controlled Ethernet network. The IGMP message may, of course, also be transmitted in the normal manner. The LSA containing the network layer address allows the nodes on the link state protocol controlled Ethernet network to establish the multicast forwarding state in the nodes to implement the network layer multicast along the shortest paths through the network.

Figure 7:
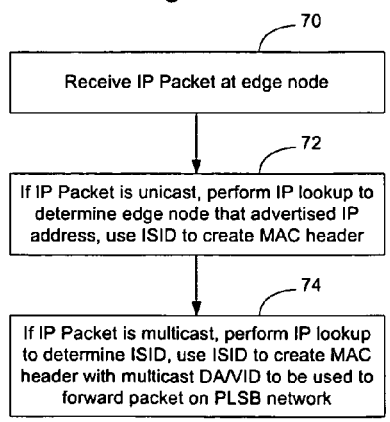
FIG. 7 is a flow diagram of a process performed at an ingress node of a link state protocol controlled Ethernet network upon receipt of an IP packet according to an embodiment of the invention.

As shown in FIG. 7, when VFE receives a network layer packet (70), it will determine if the packet is a unicast network layer packet and, if so, perform a network layer lookup to determine the correct forwarding action for the packet (72). When the packet is to be forwarded within the switched domain, the MAC address looked up will be the MAC address that was bound to the next hop network layer address (52). If the packet is a multicast network layer packet, the ingress edge node will perform a network layer lookup to determine the Ethernet group address associated with the network layer group address, and use this information to create a MAC header with the multicast DA/VID that is being used for that multicast group (74). This allows the network layer multicast to be forwarded on the link state protocol controlled Ethernet network over a multicast tree that has been created for use by the sources for the associated network layer multicast group that transit that ingress to the local switched domain.

Figure 8:
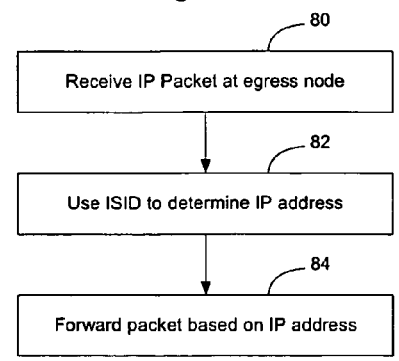
FIG. 8 is a flow diagram of a process performed at an egress node of a link state protocol controlled Ethernet network upon receipt of an IP packet according to an embodiment of the invention.

Referring now to FIG. 8, when the frame is received at the egress node (80), the egress node will strip off the MAC header as it sees itself as the destination (82) and read the network layer address associated with the packet. The egress node may then forward the packet based on the network layer address toward its intended destination (84). Additional information about how the egress node may operate to forward packets via Virtual Forwarding Entities (VFEs) is described below in connection with FIGS. 10 and 11.

Figure 9:
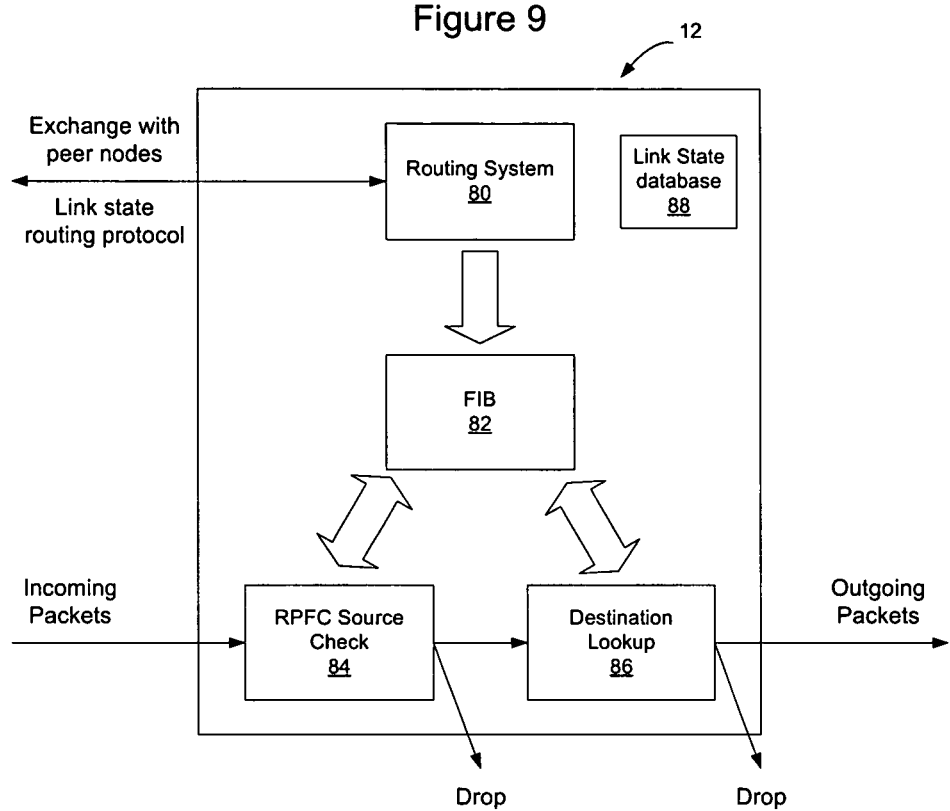
FIG. 9 is a schematic representation of a possible implementation of a network element configured to be used in a link state protocol controlled Ethernet network according to an embodiment of the invention.

FIG. 9 is a schematic representation of a possible implementation of a network element 12 configured to be used in a link state protocol controlled Ethernet network. The network element 12 includes a routing system module 80 configured to exchange control messages containing routing and other information with peers 12 in the network 10 regarding the network topology using a link state routing protocol. Information received by the routing system 80 may be stored in a link state database 90 or in another manner. As discussed previously, the exchange of information allows nodes on the network to generate a synchronized view of the network topology, which then allows the routing system module 80 to calculate the shortest paths to other nodes on the network. The shortest paths calculated by the routing system 80 will be programmed into a FIB 82, that is populated with the appropriate entries for directing traffic through the network based upon the calculated shortest paths, multicast trees, traffic engineered path entries, and based on other entries.

According to an embodiment of the invention, the routing system 80 may exchange route updates containing network layer reachability information. The network layer addresses known by nodes on the network will be stored in a link state database 90 on the network element 12 to allow ingress nodes to select the correct egress node on the link state protocol controlled Ethernet network when a network layer packet arrives. Knowledge of the network layer addressees may also allow multicast forwarding state to be implemented on the network to allow network layer multicast to be handled by the nodes on the network by causing the nodes to install forwarding state between pairs of nodes interested in the same IP multicast.

The network element 12 may also include one or more other modules such as a Reverse Path Forwarding Check (RPFC module 84 that may be used to process incoming frames and perform a lookup in the FIB 82 to determine if the port over which the frame was received coincides with the port identified in the FIB 82 for the particular Source MAC. Where the input port does not coincide with the correct port identified in the FIB, the RPFC module may cause the message to be dropped.

If the frame passes the RPFC 84 module, a destination lookup 86 module determines from the FIB 82 the port or ports over which the frame should be forwarded. If the FIB doesn't have an entry for the DA/VID, the frame is discarded.

It should also be understood that the modules described are for illustrative purposes only and may be implemented by combining or distributing functions among the modules of a node as would be understood by a person of skill in the art.

Figure 10:
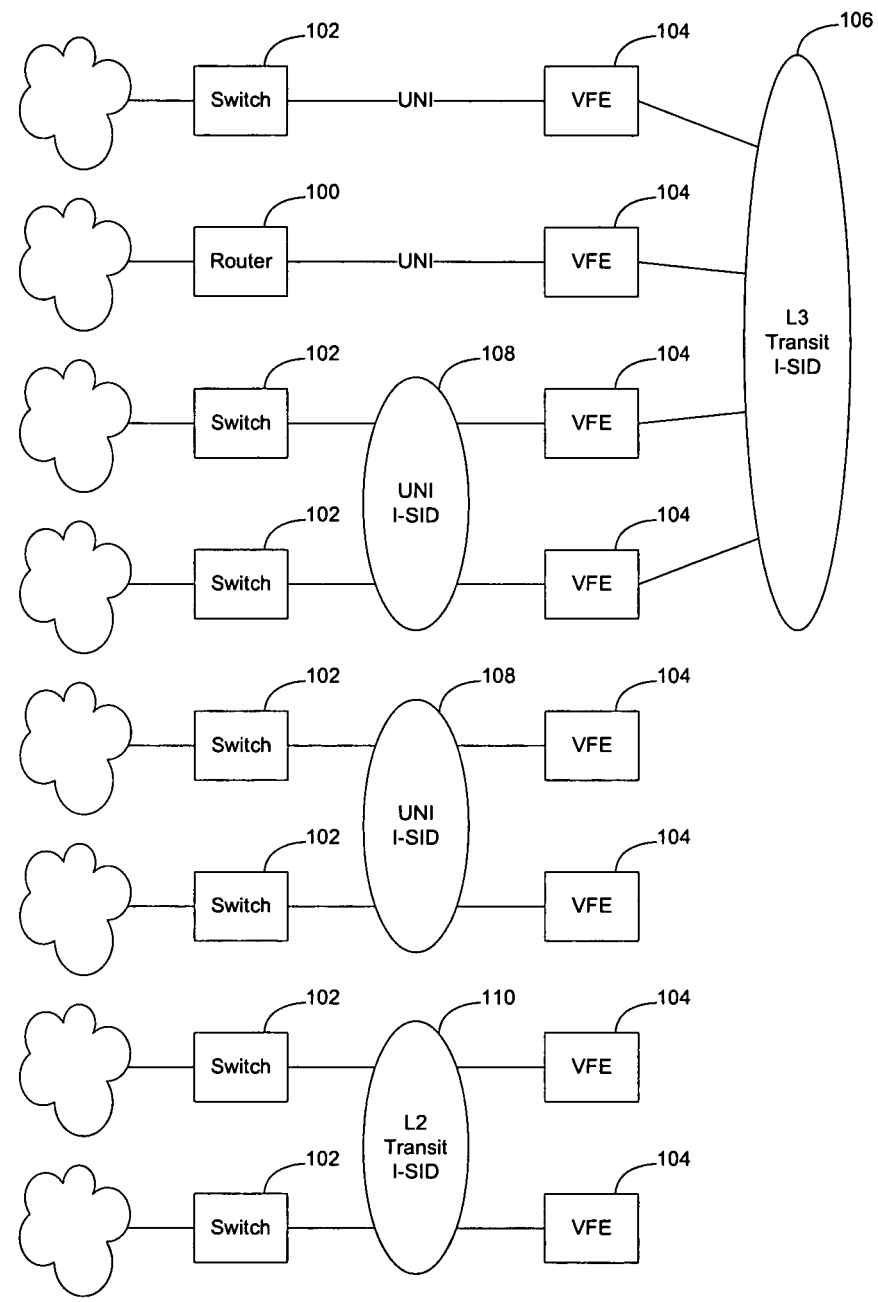
FIG. 10 provides a reference diagram of possible combinations of elements.

FIG. 10 is a reference diagram that shows several possible combinations of elements. As shown in FIG. 10, switches 100 and routers 102 may be connected to Virtual Forwarding Entities VFEs 104. A transit I-SID 106 is a LAN segment that has no address and is used to interconnect a plurality of VFEs, specifically the set of VFEs servicing the participants in the instance of mutual connectivity associated with the I-SID. The transit I-SID can interconnect an arbitrary number of VFEs, and only a single exemplar transit I-SID has been shown in FIG. 10.

As shown in FIG. 10, a switch 100 or router 102 may be connected via a UNI port to a VFE. The VFE may then be connected to other VFEs over the unaddressed transit I-SID. Alternatively, the switches may be connected to an addressed virtual link to a VFE, which is referred to herein as a UNI I-SID. The UNI I-SIDs may be connected to VFEs that are interconnected via the transit I-SID or which are otherwise not connected to each other.

It is also possible to implement a transit I-SID to interconnect VFEs via an unaddressed link in the switching network. Thus, there are many possibilities and the VFEs may be used in many ways to forward packets on the network.

One feature of the transit I-SID is that the overall amount of state for L2/L3 integration can be divided between the set of VFEs in the network. The amount of state associated with a VFE being the sum of the L2 and L3 state associated with the set of UNI I-SIDs that are directly connected via the VFE. This is typically in the form of both end system network layer addressing and network layer to Ethernet MAC bindings. Dividing the state between VFEs by the use of transit I-SIDs permits a VFE to only have knowledge of network layer information for UNI I-SIDs and ports which have an association with a common transit I-SID.

Similarly access to the L2/L3 hybrid network is not required to be via a virtual LAN segment. A physical LAN segment or physical point to point connection is also a valid attachment to the hybrid network. A physical LAN segment will similarly be identified as a UNI with a NULL I-SID, while the point to point connection case will be referred to as a UNI port.

Figure 11:
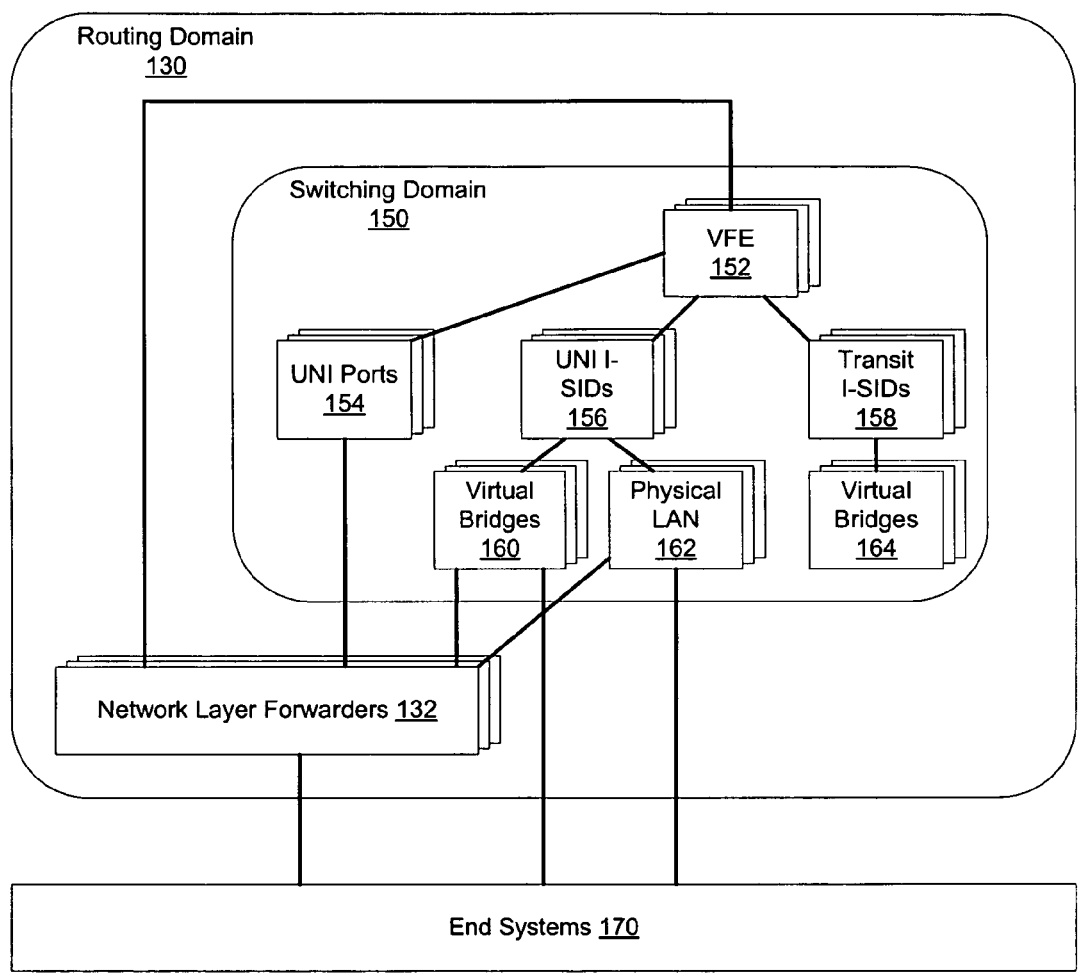
FIG. 11 shows a functional decomposition of the components of a L2/L3 hybrid network according to an embodiment of the invention.

FIG. 11 shows a functional decomposition of the components of a L2/L3 hybrid network according to an embodiment of the invention. As shown in FIG. 11, a L2/L3 hybrid network includes a routing domain 130 and a switching domain 150. The network layer 130 includes network layer forwarders 132 that are interconnected between end systems 170 and virtual forwarding entities 152 in the switching domain.

Within the switching domain, the virtual forwarding entities 152 are connected to physical UNI ports 154, addressed virtual LAN segments to other VFEs (UNI I-SIDs) 156, and an unaddressed virtual LAN segment to the other VFEs (transit I-SID) 158. The UNI ports 154 are connected to the network layer forwarders 132 to allow the VFE 152 to forward packets to the network layer forwarders. The addressed virtual LAN segments (UNI I-SIDs) 156 are associated with virtual bridges 160 and the physical LAN 162 and allow the packets to be switched within the switching domain to the network layer forwarders 132 or to the end systems 170. The transit I-SID allows the packets to be forwarded between VFEs and virtual bridges 164.

When a node in the routing domain determines that a network layer address or prefix, outside the routing domain, may be reached via itself, it will include the network layer information into its link state advertisements. This may be a result of being configured with this knowledge or by a discovery mechanism. The network layer information will be associated with a UNI I-SID, a UNI port (the valid means of directly connecting end systems to a switched domain) or with a network layer forwarder (which is used for attaching end systems not directly connected to a switched domain).

Each node in the switching domains encompassed by the routing domain will add this network layer prefix to its link state database. Nodes that implement VFEs within the switching domain will use this information to correctly populate their FIBs so that, when a packet arrives at a VFE, the VFE may read the network layer address and determine the appropriate forwarding action to continue to forward the packet on the shortest path to the network layer destination in the routing domain.

By tying network layer routing to link state protocol controlled Ethernet network forwarding, the IP services may be carried end-to-end across the link state protocol controlled Ethernet network without requiring additional signaling to set up the paths for the unicast or multicast routes required for the IP routes. This allows link state protocol controlled Ethernet network shortcuts to be created for network layer routes so that L3 forwarding may be condensed to L2 switching across the link state protocol controlled Ethernet network domain.

It is possible to support multiple network layer protocols simultaneously in a switched domain and on common interfaces outside the switched domain. Information about multiple network layer protocols (e.g. IPv4 and IPv6) may be carried via the link state routing protocol and VFEs may incorporate multiple network layers into the FIBs such that any packet received on a network layer supported by the routing domain may be correctly resolved.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A hybrid switching layer (L2)/network layer (L3) network, comprising:
   a routing domain comprising a plurality of network layer forwarders and a switching domain,
   the switching domain interconnecting network layer forwarders and end systems using Virtual Forwarding Entities (VFEs),
   the switching domain implementing a plurality of virtual LAN segments, the plurality of virtual LAN segments including at least one of an addressed virtual LAN segment and an unaddressed virtual LAN segment, the at least one addressed virtual LAN segment being configured to interconnect a one VFE of the VFEs to at least one of a network layer forwarder and end system, and the at least one unaddressed virtual LAN segment being configured to interconnect VFEs within the switched domain.

2. The hybrid L2/L3 network of claim 1, wherein the at least one unaddressed virtual LAN segment is further used to interconnect network layer forwarders with other network layer forwarders in the absence of a VFE for a community of interest including the interconnected network layer forwarders.

3. The hybrid L2/L3 network of claim 1, wherein the at least one unaddressed virtual LAN segment is further used to interconnect network layer forwarders and end systems in the absence of a VFE for a community of interest including the network layer forwarders and end systems.

4. The hybrid L2/L3 network of claim 1, wherein the at least one unaddressed virtual LAN segment is a single unaddressed virtual LAN segment.

5. The hybrid L2/L3 network of claim 1, wherein the at least one addressed virtual LAN segment includes a plurality of addressed virtual LAN segments.

6. The hybrid L2/L3 network of claim 1, wherein the at least one unaddressed virtual LAN segment interconnects a subset of all of the VFEs.

7. The hybrid L2/L3 network of claim 1, wherein the at least one addressed virtual LAN segment corresponds to at least one of virtual bridges and physical LAN segments.

8. The hybrid L2/L3 network of claim 7, wherein the virtual bridges interconnect the switching domain with one of the network layer forwarders and end systems.

9. The hybrid L2/L3 network of claim 8, wherein the VFEs are used to perform network layer forwarding between the switching domain and the routing domain.

10. The hybrid L2/L3 network of claim 9, wherein the switching domain includes a plurality of switching nodes, at least two of the plurality of switching nodes implementing the VFEs, and wherein the at least two nodes that implement VFEs within the switching domain use information associated with routes in the network domain to populate switching node FIBs in the switching domain, so that when a packet arrives at a VFE, the VFE reads the network layer address and determines the appropriate forwarding action to forward the packet on a switched path through the switching domain to the network layer destination in the routing domain.

11. The hybrid L2/L3 network of claim 1, wherein the switching domain comprises a plurality of nodes running a link state routing protocol to control population of forwarding state into forwarding information bases on the nodes in the switching domain, and wherein the link state routing protocol is used to transport network layer addresses between the nodes in the switching domain.

12. The hybrid L2/L3 network of claim 11, wherein transporting network layer addresses between the nodes in the switching domain allows the nodes to learn which network layer addressed end systems are reachable via each of the other nodes on the network domain.

13. The hybrid L2/L3 network of claim 12, wherein the nodes store network layer addresses associated with the network layer addressed end systems in link state databases, the stored network layer addresses being used to determine associations between the L2 and L3 network topology.

14. The hybrid L2/L3 network of claim 11, wherein the switching domain is an Ethernet domain.

\* \* \* \* \*